June 6, 1944.  J. H. GRAYSON  2,350,974
MILLING CUTTER
Filed Sept. 7, 1942  2 Sheets-Sheet 1
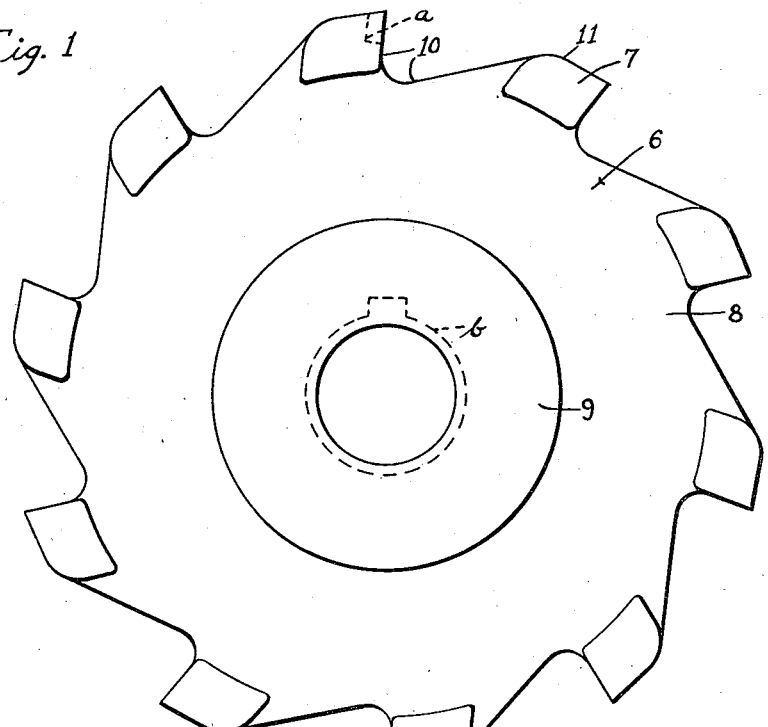
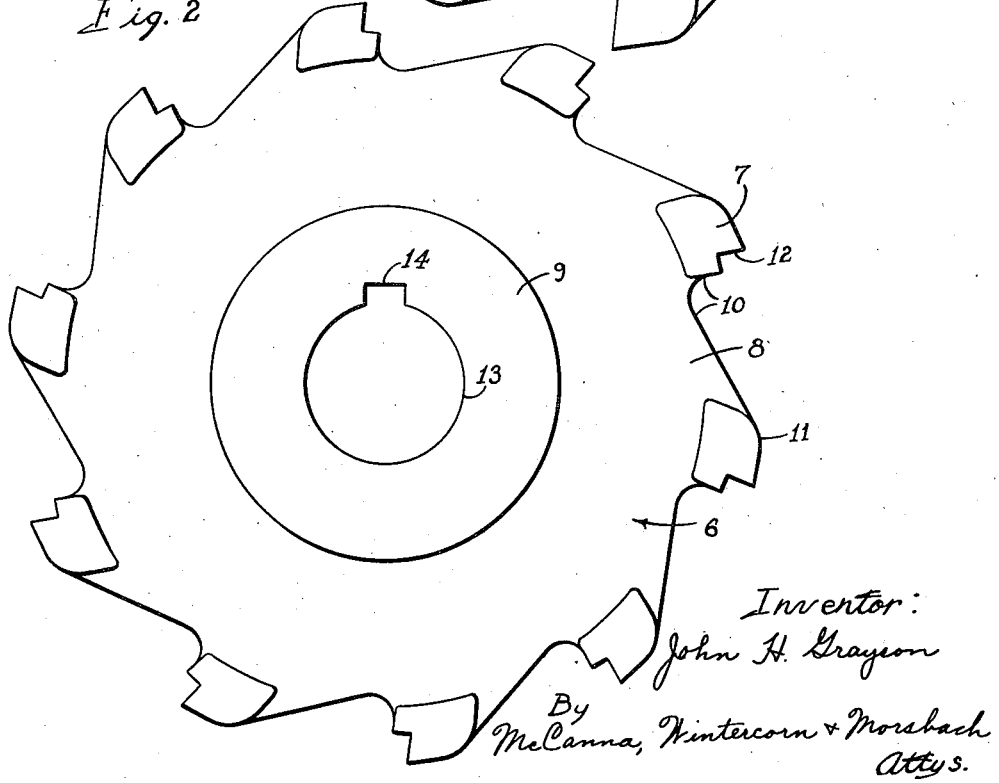
Inventor:
John H. Grayson
By
McCanna, Wintercorn & Morsbach
Attys.

June 6, 1944.　　　　J. H. GRAYSON　　　　2,350,974
MILLING CUTTER
Filed Sept. 7, 1942　　　2 Sheets-Sheet 2
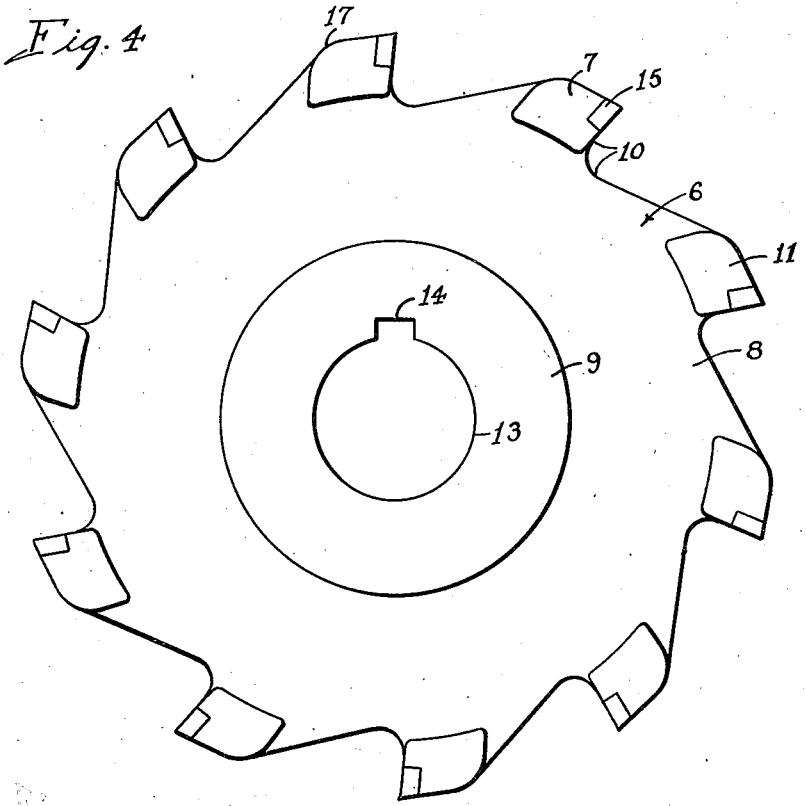
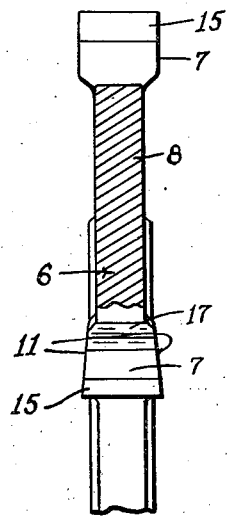
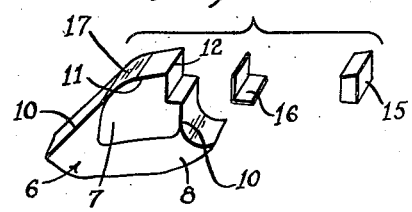
Inventor:
John H. Grayson
By
McCanna, Wintercorn & Morsbach
attys.

Patented June 6, 1944

2,350,974

UNITED STATES PATENT OFFICE 2,350,974

MILLING CUTTER

John H. Grayson, Monrovia, Calif.

Application September 7, 1942, Serial No. 457,538

6 Claims. (Cl. 29—103)

This invention relates to milling cutters having a plurality of cutting edges for use in milling machines for shaping metal by longitudinal or transverse milling.

Milling cutters have heretofore been made from solid tool steel cut from the round bar into disks or by forging the flat disks. The disks were then cut to the form of a milling cutter to provide its plural peripheral and side angles, the hole, the hub, and the recessed circular web. That method of fabricating milling cutters from solid tool steel is not only a waste of critical materials, such as tungsten, actually required only for the cutting edges, but it was wasteful in the time it consumed for both machine tools and skilled operators.

It is, therefore, the principal object of my invention to provide a milling cutter in which the disk blank or body is cast almost to the finished form desired, with all the angles, from Meehanite, so that a minimum amount of machining, less than ten per cent (10%) of that required with the old method, is sufficient to produce the desired disk body to receive the hard cutting members of tool steel, Stellite, or cemented carbides, which are bonded to the Meehanite casting with sheet silver solder.

In accordance with another feature of my invention, the cast protrusions to which the cutting members are bonded to extend beyond the cast body have a minimum of critical cutting material applied to the backs thereof, thus reducing to a minimum the use of such critical materials as tungsten, cobalt, and chromium required in the cutting parts of the milling cutter.

The invention is illustrated in the accompanying drawings, in which—

Figure 1 is a side view of the cast disk blank or body, showing in dotted lines the minimum machining required on the hub and peripheral portions;

Fig. 2 shows the casting after the machining has been done;

Fig. 3 is an exploded perspective detail view illustrating the cutting member and bonding strip therefor adjacent a machined cutter pad on which the cutting member is to be applied; and Figs. 4 and 5 are a side view and edge view of a finished cutter ready for grinding, Fig. 5 being only a partial view showing only two cutting members viewed from different angles, an intermediate portion of the cutter being broken away.

The same reference numerals are applied to corresponding parts throughout the views.

The reference numeral 6 designates a one-piece cast disk body or blank cast from Meehanite, having circumferentially 16 spaced peripheral protrusions 7 projecting radially from the web portion 8 on a circle in concentric relation to the hub 9. The blank 6 is cast substantially to the final form desired with all of the rake and clearance angles 10 and 11 required in the finished cutter. The dotted lines at $a$ and $b$ indicate the small amount of machining necessary on the protrusions 7 and hub 9, this amounting to less than ten per cent (10%) of that required where the cutters are machined from the solid disk, cut from the round bar, or forged, as previously stated. Meehanite is a high tensile perlite cast iron, which is comparatively soft and easy and economical to machine. It is, therefore, no problem to machine the seats 12 on the front faces of the protrusions or teeth 7, also to bore the center hole 13 and cut the keyway 14 in the hub 9. See Fig. 2. Meehanite also has distinct vibration damping properties which make it particularly well suited for use in the body of a milling cutter. The saving in critical material, such as tungsten, actually needed only for the cutting edges of a milling cutter, is, of course, appreciable with this substitution of Meehanite for the body, but the saving in time for both machine tools and skilled operators is also a very important factor.

In Fig. 3 I have shown in perspective a cutting member 15 and an L-shaped strip of sheet silver solder 16 for bonding the cutting member to the seat 12 of one of the teeth 7. The solder required need be only .003" thick, so that very little of the material will go a long way in the production of milling cutters in quantities. Suitable brazing fixtures can be used to hold the cutting member 15 to the seat 12 with the bonding material 16 in between in the bonding operation. The cutting members 15 may be of tool steel, Stellite, or cemented carbides. Where cemented carbides are used a much harder and superior cutting edge is obtained as compared to that obtained in the solid tungsten tool steel milling cutter used at the present time. Cemented tungsten carbide works efficiently on all steels above approximately .30 carbon and is effective up to 500 Brinell, and over a given run will require about one-fifth the number of grinds that standard high speed tool steel requires while giving two or three times the production of high speed tool steel in those operations to which its use is adapted.

Figs. 4 and 5 show the finished cutter ready for grinding, after a small amount of a critical cutting material, such as tungsten, cobalt, or chromium, has been applied to the Meehanite body on the shoulders 17, with an oxy-acetylene torch or any electrical heat induction apparatus, whereby to permit bonding the hard metal without danger of reducing the temper of the cutting members 15.

While the cutter shown is of the side-milling type, it should be obvious that the invention is not to be regarded as limited to that type, but is applicable to face-milling cutters, half-side milling cutters, and staggered-tooth milling cutters. In the latter two types the cutting members 15 have been applied to spiral teeth having the seats 12 in angular relation to the axis of rotation. In all milling cutters embodying my invention, vibration and chatter are reduced instead of amplified due to the vibration damping qualities of the Meehanite body. The cemented carbide cutting members firmly bonded to the Meehanite have enabled high speed milling which was heretofore conceded to be impossible with the old conventional milling cutters.

It is believed the foregoing description conveys a good understanding of the objects and advantages of my invention. The appended claims have been drawn to cover all legitimate modifications and adaptations.

I claim:

1. A milling cutter comprising a one-piece disk body of a cast metal having high tensile strength to make the same suitable for use in the cutter body, said body being formed to provide, with minimum machining, a hub portion and an annular web portion of reduced thickness integral therewith, the outer periphery of the web portion being formed to provide circumferentially spaced radially projecting portions of increased thickness conformed peripherally with the ultimate rake and clearance angles as though said projecting portions were intended to be cutter teeth, said projections each having a seat formed on the front face for metal-cutting members, and separate, relatively small, hard metal-cutting members fastened to said body, one on each of said seats, formed to provide cutting edges on the outermost portions thereof.

2. A cutter as set forth in claim 1, wherein said cutting members are fastened to said seats by means of sheet solder inserted between the seats and members and bonded thereto by fusion.

3. A cutter as set forth in claim 1, wherein the trailing shoulder portion of each of said projecting portions has a covering of hard wear-resisting metal applied thereto.

4. A cutter as set forth in claim 1, wherein the trailing shoulder portion of each of said projecting portions has a covering of hard wear-resisting metal applied thereto by fusion.

5. A milling cutter, comprising a preformed integral metallic body including on its outer periphery circumferentially spaced, radially projecting cutter teeth portions, said projecting portions each being cut away on the front face to provide substantially right angle seats for metal-cutting members to complete cutter teeth, the depth of the cut-out portion measured circumferentially of the body being substantially less than half the width of the projecting portions measured circumferentially of the body, the depth of the cut-out portions measured radially of the body being a fraction of the radial dimension of the front faces of said projecting portions, and separate, relatively small, hard metal-cutting members of substantially uniform thickness fastened to said body, one on each of said seats filling the cut-out portions and providing cutting edges on the outermost portions thereof.

6. A milling cutter comprising a one-piece body of cast metal having a relatively high tensile strength, the said body being so cast as to provide with minimum machining a member, the outer periphery of which is provided with radially projecting portions of increased thickness intended to be cutter teeth, said projections each having a seat machined on the front face thereof accurately with respect to the axis of rotation of the said body member to receive metal-cutting members, and separate, hard metal-cutting members bonded to the said body member one on each of said seats, formed to provide cutting edges on the outermost portions thereof.

JOHN H. GRAYSON.